United States Patent
Christensen (10) Patent No.: US 8,645,490 B2
(45) Date of Patent: Feb. 4, 2014

(54) WEB SITE IMPLEMENTATION BY MAPPING EXPRESSION EVALUATION

(75) Inventor: Erik Bo Christensen, Shoreline, WA (US)

(73) Assignee: Microsoft Corporation, Redmond, WA (US)

( * ) Notice: Subject to any disclaimer, the term of this patent is extended or adjusted under 35 U.S.C. 154(b) by 806 days.

(21) Appl. No.: 12/795,766

(22) Filed: Jun. 8, 2010

(65) Prior Publication Data
US 2011/0302267 A1 Dec. 8, 2011

(51) Int. Cl.
G06F 15/16 (2006.01)
(52) U.S. Cl.
USPC ........... 709/217; 709/213; 709/223; 709/226; 709/230; 709/245; 707/3; 707/10; 707/100; 717/114
(58) Field of Classification Search
USPC ......... 709/217–219, 223, 226, 213, 230, 231, 709/245; 717/114; 707/3, 10, 100
See application file for complete search history.

(56) References Cited

U.S. PATENT DOCUMENTS

| 7,089,560 | B1 | 8/2006 | Uhler et al. |
| 7,644,414 | B2 | 1/2010 | Smith et al. |
| 7,890,928 | B2 * | 2/2011 | Patrudu ........................... 717/114 |
| 8,224,994 | B1 * | 7/2012 | Schneider ...................... 709/245 |
| 8,396,970 | B2 * | 3/2013 | Black et al. .................... 709/226 |
| 8,402,451 | B1 * | 3/2013 | Sweeney ........................ 717/158 |
| 8,429,287 | B2 * | 4/2013 | Sullivan ......................... 709/231 |
| 8,433,771 | B1 * | 4/2013 | Ellsworth et al. ............. 709/213 |
| 8,438,298 | B2 * | 5/2013 | Arai et al. ...................... 709/231 |
| 2002/0046240 | A1 | 4/2002 | Graham et al. |
| 2003/0018827 | A1 | 1/2003 | Guthrie et al. |
| 2003/0191812 | A1 * | 10/2003 | Agarwalla et al. ............. 709/217 |
| 2004/0205574 | A1 | 10/2004 | Sayers et al. |
| 2004/0267813 | A1 | 12/2004 | Rivers-Moore et al. |
| 2005/0240943 | A1 * | 10/2005 | Smith et al. .................... 719/328 |
| 2006/0020586 | A1 * | 1/2006 | Prompt et al. ..................... 707/3 |
| 2006/0129616 | A1 * | 6/2006 | Chen ............................. 707/204 |
| 2006/0143592 | A1 | 6/2006 | Bender et al. |
| 2006/0173873 | A1 * | 8/2006 | Prompt et al. ................ 707/100 |
| 2006/0174320 | A1 * | 8/2006 | Maru et al. ........................ 726/1 |

(Continued)

OTHER PUBLICATIONS

Overeinder, et al., "Scalable Middleware Environment for Agent-Based Internet Applications", Retrieved at << http://citeseerx.ist.psu.edu/viewdoc/download?doi=10.1.1.145.1471&rep=rep1&type=pdf >>, In Proceedings of the Workshop on State-of-the-Art in Scientific Computing (PARA'04), vol. 3732, 2004, pp. 675-679.

(Continued)

Primary Examiner — Thu Ha Nguyen
(74) Attorney, Agent, or Firm — Ogilvie Law Firm (57) ABSTRACT

Web sites are modeled using mappings from paths to expressions. A mapping data structure of expressions represents a web site's hierarchical structure, and an enumerator, an array of characters, or an array of bytes represents the web site's content. Expressions are written in a declarative programming language, and are lazily evaluated to provide results used in HTTP responses. A mapping may be recursive. An expression may contain a function call which returns contents of a file named in the HTTP request path, or the expression may evaluate to a text string, for example. Expressions may call functions which produce side-effects. An expression may recursively map a directory name to a mapping of a file name. Scalability is promoted by concurrently evaluating expression(s) on different machines in a stateless middle tier, and by streaming results. An arbitrarily large web site may be implemented in this manner.

20 Claims, 3 Drawing Sheets

(56) References Cited

U.S. PATENT DOCUMENTS

| | | | |
|---|---|---|---|
| 2006/0242653 A1 | 10/2006 | Kostadinovich | |
| 2006/0265508 A1* | 11/2006 | Angel et al. | 709/230 |
| 2008/0005273 A1* | 1/2008 | Agarwalla et al. | 709/217 |
| 2008/0228809 A1 | 9/2008 | Shan et al. | |
| 2009/0106255 A1* | 4/2009 | Lacapra et al. | 707/10 |
| 2010/0125829 A1 | 5/2010 | Lee et al. | |
| 2010/0262631 A1* | 10/2010 | Andersson et al. | 707/809 |
| 2010/0281178 A1* | 11/2010 | Sullivan | 709/231 |
| 2010/0318427 A1* | 12/2010 | Miranda | 705/14.66 |
| 2011/0166885 A1* | 7/2011 | Walker et al. | 705/3 |
| 2011/0213783 A1* | 9/2011 | Keith, Jr. | 707/741 |
| 2011/0222107 A1* | 9/2011 | Williams | 358/1.15 |
| 2011/0302267 A1* | 12/2011 | Christensen | 709/217 |
| 2012/0059840 A1* | 3/2012 | Reddy et al. | 707/763 |
| 2012/0198042 A1* | 8/2012 | Dunbar et al. | 709/223 |
| 2012/0198071 A1* | 8/2012 | Black et al. | 709/226 |
| 2012/0265782 A1* | 10/2012 | Turner et al. | 707/769 |
| 2012/0303745 A1* | 11/2012 | Lo et al. | 709/217 |
| 2012/0331203 A1* | 12/2012 | Matsuzawa et al. | 711/4 |
| 2013/0152060 A1* | 6/2013 | Sweeney | 717/141 |

OTHER PUBLICATIONS

Fensel, et al., "The Web Service Modeling Framework WSMF", Retrieved at << http://www.cs.umbc.edu/courses/691s/papers/wsmf.paper.pdf >>, Electronic Commerce Research and Applications, 2002, pp. 1-33.

"Designing Scalable IIS Applications", Retrieved at << http://msdn.microsoft.com/en-us/library/ms525522(VS.90).aspx >>, Retrieved Date: Apr. 22, 2010, pp. 2.

"Web-Tier Application Framework Design", Retrieved at << http://java.sun.com/blueprints/guidelines/designing_enterprise_applications_2e/web-tier/web-tier5.html >>, Retrieved Date: Apr. 22, 2010, pp. 20.

"ASP, PHP and SQL", Retrieved at << http://www.qualitylogic.com/Contents/Enterprise/Technology/ASP-PHP-SQL.aspx >>, copyright 2008-2009, pp. 1.

"ASP.NET", Retrieved at << http://en.wikipedia.org/wiki/ASP.NET >>, May 13, 2010, pp. 14.

"Data Development Videos (Pre-Release)", Retrieved at << http://msdn.microsoft.com/en-us/data/dd229322.aspx#quadrant >>, May 2009-Jan. 2010, pp. 5.

Gavin Clarke, "Dial 'M' for Microsoft's new programming language", Retrieved at << http://www.theregister.co.uk/2008/10/10/dial_m_for_microsoft/print.html , Oct. 10, 2008, pp. 3.

"Lazy evaluation", Retrieved at << http://en.wikipedia.org/wiki/Lazy_evaluation >>, Apr. 1, 2010, pp. 4.

"M-expression", Retrieved at << http://en.wikipedia.org/wiki/M-expression >>, Feb. 28, 2010, pp. 2.

"SQL Server Modeling CTP and Model-Driven Applications", Retrieved at << http://msdn.microsoft.com/en-us/library/dd129514(VS.85).aspx >>, Retrieved date Apr. 23, 2010, pp. 5.

"Sample Model Data for Microsoft code name 'Quadrant'", Retrieved via << http://archive.msdn.microsoft.com/ >>, Oct. 8, 2009, pp. 2.

"Top Ten Questions and Answers on Data", Retrieved at << http://msdn.microsoft.com/en-us/data/bb525059.aspx >>, Retrieved Date Apr. 23, 2010, pp. 4.

"Web application framework", Retrieved at << http://en.wikipedia.org/wiki/Web_application_framework >>, Apr. 19, 2010, pp. 5.

* cited by examiner

WEB SITE IMPLEMENTATION BY MAPPING EXPRESSION EVALUATION

BACKGROUND

A form of web site implementation occurs, for example, when a web application retrieves, creates, modifies, or otherwise provides web pages during execution. Web applications are sometimes created using a web application framework. Such frameworks may facilitate web application development by providing libraries for database access, providing templates, managing sessions, and promoting code reuse, for example. Web application frameworks may help programmers build dynamic web sites, web applications, and web services. Web sites can also be implemented using web-scripting tools. Scripts embedded into HTML source can be interpreted by a web server to generate a web page.

SUMMARY

Developing scalable dynamic web applications can be a complex and challenging project. Some embodiments described herein provide approaches that can make web site implementation easier by allowing programmers to use declarative structures containing expressions whose evaluation generates web pages on demand.

For example, some embodiments receive an HTTP request which includes a path, and map from the path to an expression in a nestable mapping data structure; the mapping data structure can contain multiple expressions which collectively represent the web site. Evaluating the expression provides a result, without necessitating evaluation of other expressions of the mapping data structure. An HTTP response to the HTTP request, containing the evaluation result, is generated and provided, e.g., in the form of a dynamic web page, an image, a cascading style sheet, or another web resource. Responses to FTP requests, and to other network application layer requests utilizing a hierarchical naming scheme, may also be generated in some embodiments.

In some embodiments, the expression is written in a declarative (as opposed to imperative) programming language. Evaluation of the expression may include parsing or making a function call consistent with rules of the particular declarative programming language. Evaluation may also utilize a lazy evaluation mechanism of the declarative programming language. The expression may contain, for example, a call to a function which returns contents of a file named in the path, or a function which returns a text string, or the expression may evaluate to a text string. In some cases, the expression may call a function which produces a side-effect, e.g., DELETE, PUT, POST, or the like. Some embodiments recursively map a directory name to a mapping of a file name; some recursively map a dynamically constructable record which includes at least one field-value pair. In some embodiments, the expression occurs in a mapping data structure which is declared in a version of an M programming language.

Some embodiments promote scalability. For example, some receive multiple HTTP requests at different machines in a network, concurrently evaluate expression(s) of the same mapping data structure on the different machines, concurrently generate respective HTTP responses, and transmit the respective HTTP responses toward the multiple sources of the requests. In particular, HTTP responses containing streams of web site content can be generated. In some embodiments, copies of a lazy expression evaluator evaluate the same expression and reside on multiple machines in a stateless middle tier in a network, thereby promoting scalability.

Some embodiments electronically declare a computer data structure which maps portions of a Uniform Resource Identifier (URI) path to respective expressions. The mapping may be recursive. Digital web site content is made electronically accessible to a fully automatic evaluation mechanism which is operable to perform lazy evaluation of the expressions, based on automatically located dependencies that have been made declaratively. Some embodiments implement an arbitrarily large web site, namely, a web site which has no fixed upper bound on storage size in the absence of lazy evaluation of the expressions. Some model a web site by providing the mapping data structure of expressions to represent the web site's hierarchical structure, and by providing an enumerator, an array of characters, and/or an array of bytes to represent the web site's content.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

One widely used web application framework is the ASP.NET™ framework available from Microsoft® Corporation. ASP.NET technology helps programmers build dynamic web sites, web applications, and web services; it followed Microsoft's Active Server Pages (ASP) technology. The ASP.NET environment utilizes the Microsoft® Common Language Runtime (CLR), allowing programmers to write ASP.NET code using a variety of supported programming languages. Web sites can also be implemented using web-scripting tools such as ASP and PHP scripts. PHP, also known as Hypertext Preprocessor, is a widely used general-purpose scripting language originally designed for web development of dynamic web pages. PHP code can be embedded into HTML source, and can be interpreted by a web server PHP processor which generates a web page using the PHP.

Although ASP.NET technology and other familiar technologies can be helpful, developing scalable dynamic web applications can nonetheless be quite difficult. Some embodiments described herein can make the authoring of scalable dynamic web applications easier by allowing developers to use lazily evaluated declarative mapping data structures. Some embodiments provide mechanisms for implementing a web site using lazily evaluated declarative mapping data structures in which the contents of the web site are calculated by expressions that make up the mapping data structures. A mapping specifies how an HTTP response corresponds to a part of the mapping data structure. Only the part of the mapping data structure that is requested for a given HTTP request need be calculated, thereby promoting both efficiency and flexibility.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises his right to his own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

Throughout this document, use of the optional plural "(s)" means that one or more of the indicated feature is present. For example, "request(s)" means "one or more requests" or equivalently "at least one request".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "transmitting to", "sending toward", or "communicating to" a destination may involve intervening action such as forwarding, copying, uploading, downloading, encoding, decoding, compressing, decompressing, encrypting, decrypting and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

Figure 1:
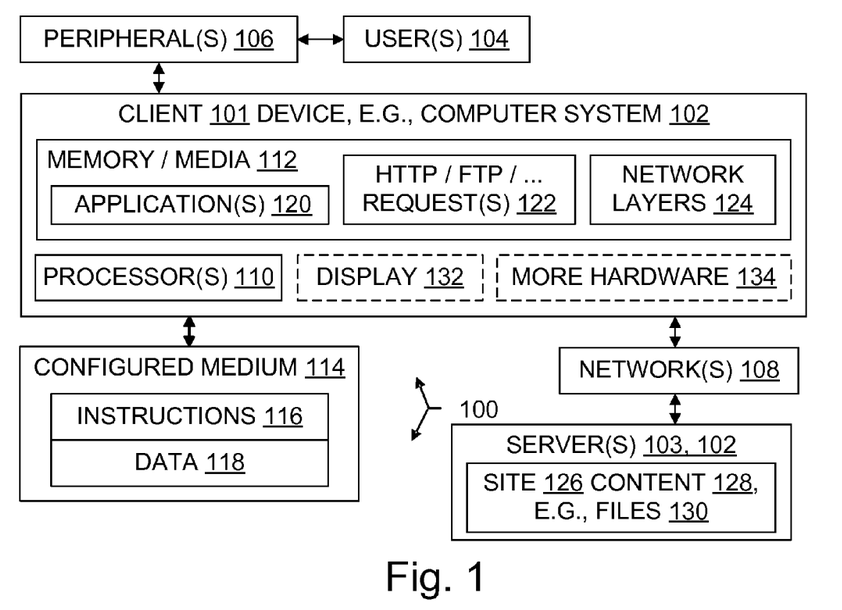
FIG. 1 is a block diagram illustrating a client having at least one processor, at least one memory, and one or more applications which make requests to a server, and other items in an operating environment which may be present on multiple network nodes, and also illustrating configured storage medium embodiments.

With reference to FIG. 1, an operating environment 100 for an embodiment may include client 101 device(s) and server 103 device(s), each of which may include a computer system 102. Each of the computer systems 102 may be a multiprocessor computer system, or not. An operating environment may include one or more machines in a given computer system, which may be clustered, client-server networked, and/or peer-to-peer networked.

Human users 104 may interact with the computer systems 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

Each computer system 102 includes at least one logical processor 110. Each illustrated computer system 102, like other suitable systems, also includes one or more computer-readable storage media 112. Storage media 112 may be of different physical types. The storage media 112 may be volatile memory, non-volatile memory, fixed in place media, removable media, magnetic media, and/or optical media, as opposed to propagated signal media. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by as discussed herein, e.g., requests are transformed into responses by locating, mapping, lazily evaluating, declaring, generating, calling, binding, deployment, execution, modification, display, creation, loading, and/or other operations.

Applications 120 such as web browsers, media players, email managers, and/or game managers, for example, make requests 122 (generally by way of protocol stacks or other network layers 124) to obtain web site 126 content 128 such as files 130 over a network 108, to update a display 132, for example. Applications 120, other software, requests 122, and other items shown in the Figures may reside partially or entirely within one or more media 112, thereby configuring those media. An operating environment may also include other hardware 134, such as buses, power supplies, and graphics accelerators, for instance.

Items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
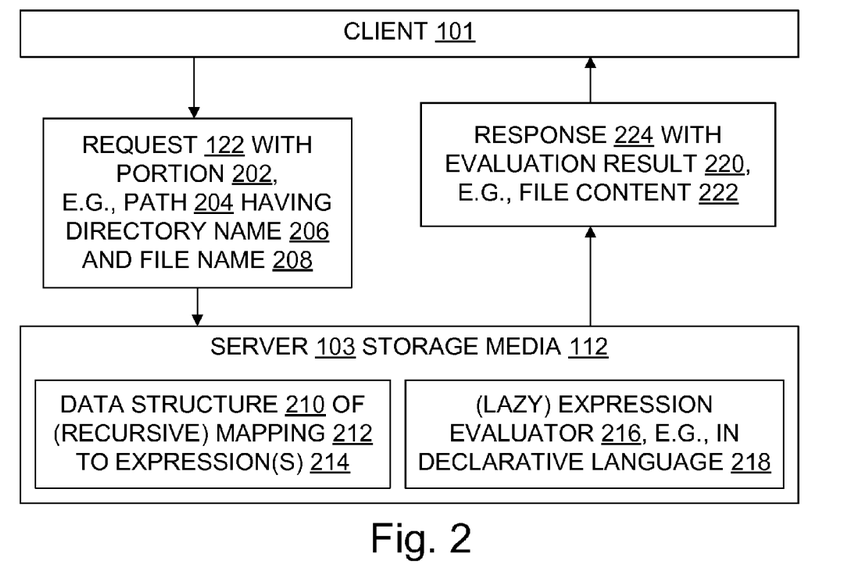
FIG. 2 is a data flow diagram illustrating aspects of web site implementation using lazily evaluated expressions of a declarative mapping in an example architecture.

FIG. 2 illustrates an architecture which is suitable for use with some embodiments. System embodiments may be seen as supporting process embodiments, and vice versa. Assume a client 101 sends requests 122 over a network 108 toward a server 103. The requests 122 can be created using a familiar web browser or other familiar application 120. In some embodiments, no special syntax or semantics is required in the requests 122; in that sense, the presence of an embodiment in the server is transparent to the clients.

The requests 122 have various portions 202. For example, an HTTP request has a prefix such as "http://" or "https://", a method or verb such as GET, and a path 204, such as a Uniform Resource Identifier (URI) or another path 204. In requests 122 to get a file 130, the path 204 generally includes a directory name 206 and a file name 208.

Some embodiments process requests 122 at a server 103 using a mapping data structure 210 which includes a mapping 212 of request portion(s) 202 to expressions 214 which, upon evaluation, produce a response to the request. A lazy expression evaluator 216 evaluates the expression(s) 214 that correspond under the mapping 212 to the particular request 122. The expressions may be written in a declarative programming language 218, such as a version of the M programming language, or another programming language equipped with a lazy expression evaluator 216 for evaluating expressions which describe what result 220 should be provided, rather than describing how to compute the result. The result 220 of the expression evaluation, such as file content 222, 128, is sent back to the client 101 in a response 224. In some embodiments, no special syntax or semantics is required in the responses 224, in that the presence of an embodiment in the server is transparent to the clients.

With reference to FIGS. 1 and 2, some embodiments provide a computer system 102 with a logical processor 110 and a memory medium 112 configured by circuitry, firmware, and/or software to transform requests 122 into responses 224 by mapping request portions to lazily evaluated expressions as described herein. For example, some embodiments include a computer system 102 having at least one logical processor 110, and a memory 112 in operable communication with the logical processor(s). The memory is located in at least one machine; in some embodiments, memory is located in multiple servers 103.

A mapping 212 resides in the memory and maps portions 202 of a network application layer 124 requests to respective expressions 214. A lazy expression evaluator 216 also resides in the memory. The evaluator 216 is operable to evaluate an expression in response to a request, and more specifically, to evaluate an expression E in response to a portion P of a request that seeks access to content 128. The request portion P is mapped to the expression E by the mapping data structure 210. The mapping data structure 210 includes one or more expressions, and associated mapping 212 code that is operable to select portions 202 and map them to the expression(s).

As used herein, a "server" 103 may be a single destination machine, or it may be an intermediary machine, or a collection of machines. For example, the response result 220 may be calculated on a different server machine than the server machine that sends the response 224 to the client.

In some embodiments, the system includes an HTTP request 122 and/or an FTP request 122 configuring a medium 112. In some, the system includes a network application layer request 122 utilizing some other hierarchical naming scheme. The lazy expression evaluator 216 is operable to evaluate an expression in response to the request 122. Although HTTP is used as a frequent example herein, in some embodiments the mapping data structure 210 maps FTP requests to expressions. Like HTTP, FTP has a hierarchical naming schema suitable for such mappings.

In some embodiments, copies of the lazy expression evaluator 216 reside (configure memory and/or other media 112) on multiple server machines in a stateless middle tier in a network 108. In some cases those multiple evaluators (or a subset of them) evaluate the same expression 214. It will be appreciated that the ability to place stateless copies of a computation on multiple machines tends to promote scalability.

In some embodiments, in some cases an expression 214 in the mapping can be directly evaluated, while in other cases the expression calls a function whose return value is part of the calculation of the expression value. In some embodiments, the function(s) called in an expression 214 can include any function supported in the declarative programming language environment. Functions may be general purpose, such as database accesses or email notice generators, or functions may be tailored to particular dynamic web sites. In one embodiment, for example, an expression 214 in the mapping includes a call to a File-Contents function which is operable to return contents of a file as binary data. In a key-value pair implementation of a mapping data structure 210, for instance, a value of a key "b.gif" is the result of calling a function File:Contents with the path "c:\b.gif", which will return the contents of the file as binary data.

In some embodiments, the system contains in memory a network application layer request 122 identifying a file 130, an expression 214 to which the request is mapped, and a result 220 of a lazy evaluation of the expression. In some cases, the result 220 includes metadata which specifies a content type for the file. File content type may be determined, for example, by the extension within a file name 208.

In some embodiments, the mapping 212 is recursive. For example, one mapping data structure 210 is declared recursively as follows:

```
Map:From
(
    [
        {Key ="b.gif", Value = File:Contents("c:\b.gif") },
        {Key = "a.html", Value = "<html><body>" + "hello" +
          "</body></html>" },
        {Key = "dir", Value = Map:From([ { Key = "c.txt", Value =
        "hello world" ^^ { Content:Type = "text/plain" } ]) }
    ]
)
```

The foregoing can be viewed as two examples, one which shows a static mapping and one that shows a dynamic mapping example. Such a static recursive example is:

```
map
{
    "b.gif" = File:AsBytes("c:\b.gif"),
    "a.html" = "<html><body>" + "hello" + "</body></html>"
            ^^ { Content:Type = "text/html" },
    "dir" =
    map
    {
        "c.txt" = "hello world" ^^ { Content:Type = "text/plain" }
    }
}
```

Such a dynamic example shows the contents of the "dir" key being generated based on the contents of a directory on the disk:

```
map
{
    "b.gif" = File:AsBytes("c:\b.gif"),
    "a.html" = "<html><body>" + "hello" + "</body></html>"
            ^^ { Content:Type = "text/html" },
    "dir" =
        Map:From(
            Path:Search("c:\dir")
            where item.Kind == "File"
            select { Key = item.Name, Value = File:AsBytes(item.Path) }
        )
}
```

In some embodiments, an expression 214 in the mapping 212 includes a call to a function which is operable to produce a side-effect. For example, in some cases an expression calls HTTP POST, PUT, and/or DELETE functions which produce side-effects.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment. For example, applications 120 may execute on multiple client devices/systems 102 in a networked cloud, mappings 212 may reside on yet other devices within the cloud, and the responses 224 may configure the displays 132 on yet other cloud device(s)/system(s) 102.

Processes

Figure 3:
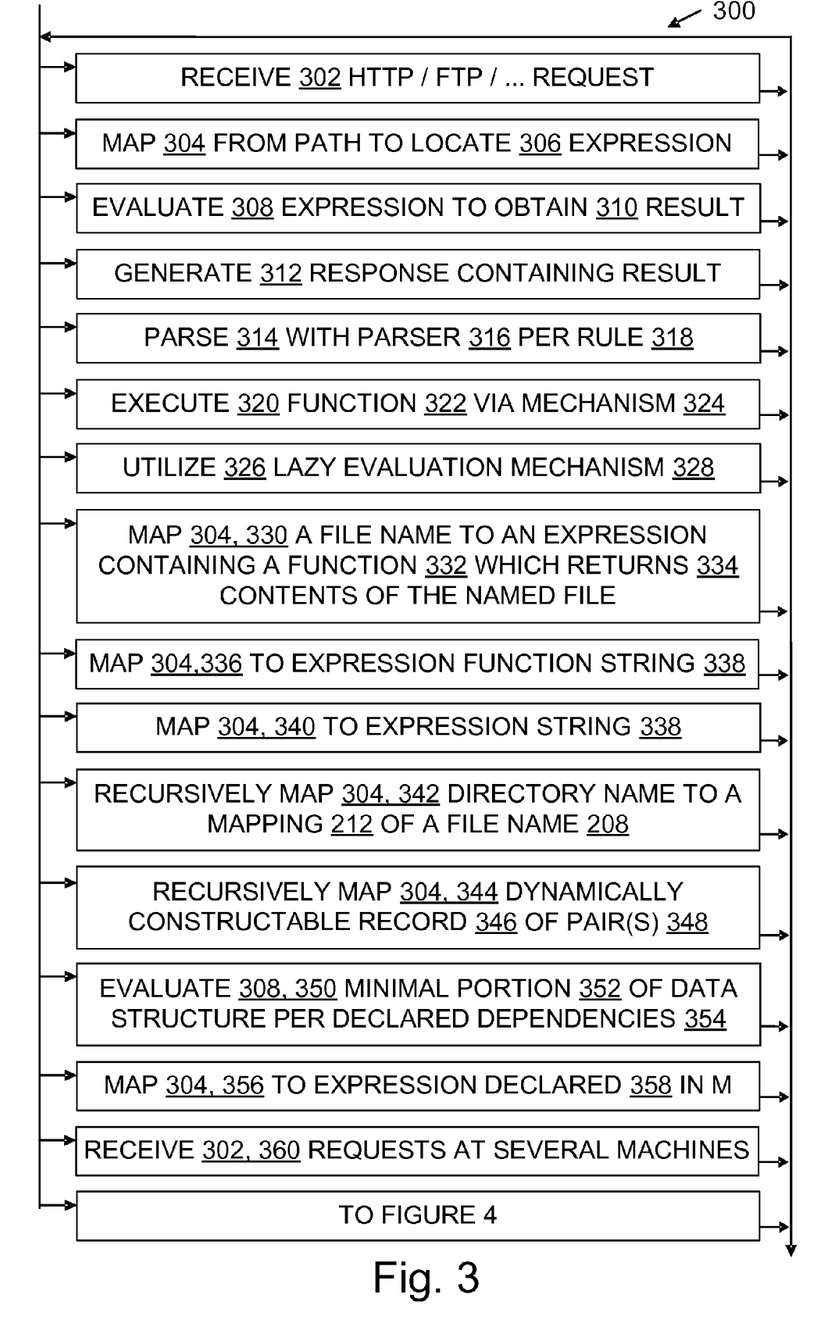
FIGS. 3 and 4 collectively are a flow chart illustrating steps of some process and configured storage medium embodiments.
Figure 4:
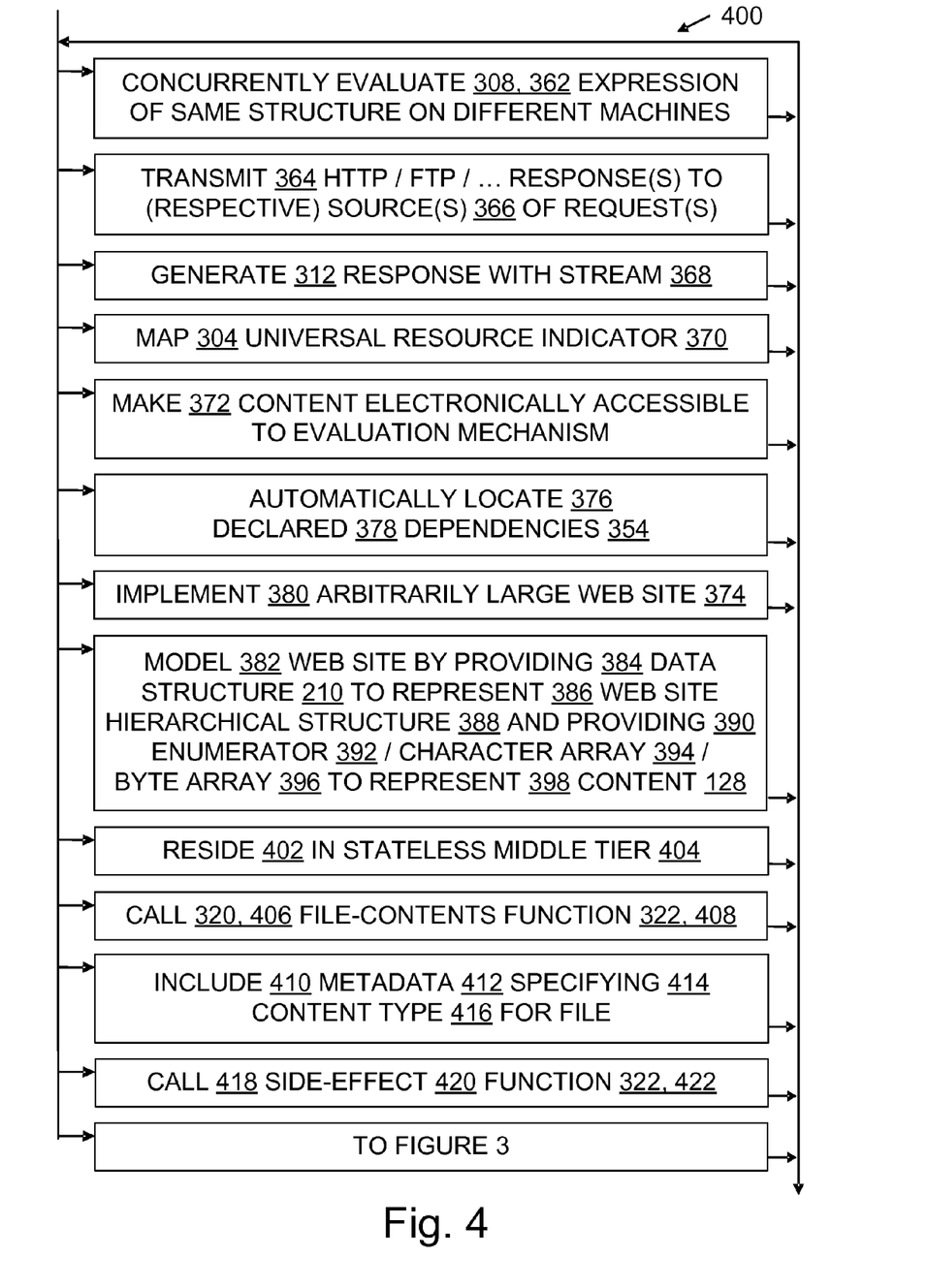

FIGS. 3 and 4 illustrate some process embodiments in connected flowcharts 300 and 400. Processes shown in the Figures may be performed in some embodiments automatically, e.g., by mappings 212 and evaluators 216 producing responses 224 for a testing tool or other client 101 that is making and sending requests 122 under control of a script requiring little or no user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIGS. 3 and 4. Steps may be performed serially, in a partially overlapping manner, or fully in parallel. The order in which flowchart(s) 300 and/or 400 are traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a request receiving step 302, an embodiment receives an HTTP request 122, an FTP request 122, or another request 122. Step 302 may be accomplished using familiar network transmission software and hardware, or other mechanism, for example.

During a mapping step 304, an embodiment maps a portion of a request 122 to an expression 214. Mapping may be accomplished using substeps such as parsing the request to extract a mappable portion 202, comparing the extracted portion 202 with keys in a mapping data structure 210 to find a key-value pair to which the portion 202 is mapped, and locating 306 an expression 214 as a value in the key-value pair for the identified key. Step 304 may be accomplished using parsers, regular expressions and other string comparison tools, and other familiar mechanisms, adapted for mappings 212 as taught herein.

During an expression evaluating step 308, an embodiment evaluates an expression 214, thereby obtaining 310 an evaluation result 220. Step 308 may involve calling functions specified in expressions. Step 308 may be accomplished using familiar expression evaluators 216, such as expression evaluators in declarative languages 218. In particular, some embodiments evaluate 308 expressions 214 by lazily invoking an expression evaluator in an M programming language environment.

During a response generating step 312, an embodiment generates a response 224 which contains at least one evaluation result 220. Step 312 may be accomplished using familiar mechanisms for formatting content 128 and other data into HTTP, FTP, or other formats, adapted to utilize evaluation result(s) 220 as content 128 and/or other data in a response.

During an expression parsing step 314, an embodiment parses an expression 214 in the course of evaluating 308 the expression. Parsing may be accomplished using familiar parsers 316 which comply with syntactic and semantic rules 318 of the declarative programming language 218 in which the expression being parsed is written.

During a function executing step 320, an embodiment executes a function 322 called in an expression 214, in the course of evaluating 308 the expression. Execution of functions 322 may be accomplished using familiar mechanisms 324 for function invocation and execution which comply with syntactic and semantic rules 318 of the declarative programming language 218 (including its runtime environment) in which the expression containing the function is written.

During a lazy evaluation utilizing step 326, an embodiment utilizes a lazy evaluation mechanism 328 to lazily evaluate 308 an expression 214 of a mapping 212. Step 326 may be accomplished using familiar lazy evaluation mechanisms 328, such as some expression evaluators 216 in declarative languages 218. In particular, some embodiments evaluate 308 expressions 214 by utilizing an M programming language expression evaluator 216 as the lazy evaluation mechanism 328.

In some embodiments, the evaluation mechanism 328 is lazy in the sense that other expressions of the mapping 212, which the current request 122 did not map to, are not evaluated. Only the expression to which the request 122 was mapped 304 gets evaluated to generate a response. In some embodiments, evaluation of part of the mapped expression is also avoided when not needed to generate the desired result 220, that is, "short-circuit" lazy evaluation is used.

During a file name to expression file contents function mapping step 330, which is an example of mapping step 304, an embodiment maps a file name 208 portion of a path to an expression 214 containing a call to a function 322, 332 which, on being invoked, will return 334 contents 128 of the file 130 that is named by the file name 208.

During a file name to expression string function mapping step 336, which is an example of mapping step 304, an embodiment maps a file name 208 portion of a path to an expression 214 containing a call to a function 322 which, on being invoked, will return 334 a text string 338.

During a file name to expression string mapping step 340, which is an example of mapping step 304, an embodiment maps a file name 208 portion of a path to an expression 214 which, on being evaluated 308, will result in a text string 338.

During a recursive directory name mapping step 342, which is an example of mapping step 304, an embodiment recursively maps a directory name 206 portion of a path to a mapping of a file name 208. The file name mapping may in turn may involve file name mapping steps, such as steps 340, 336, 330.

During a recursive record mapping step 344, which is an example of mapping step 304, an embodiment recursively maps a dynamically constructable record 346 as a map. In the case of an empty directory being mapped with such a record 346, the record will contain no key-value pairs, but in other cases the record 346 will contain one or more key-value pairs 348. Key-value pairs are sometimes referred to as field-value pairs. Mapping data structures 210 provide some examples of record 346 syntax and semantics, but mapping data structures 210 are not necessarily dynamically constructed. Step 344 may be viewed as a generalization of recursive directory name mapping step 342, to handle a set of path 204 elements that include not only directory names 206 and a terminal file name but also other elements used in a given application layer request hierarchical naming scheme, e.g., subnet names, company names, node identifiers, date ranges, and so forth.

During a minimal portion evaluating step 350, which is an example of evaluating step 308, an embodiment evaluates at most a minimal portion 352 of a mapping data structure 210. That is, the embodiment evaluates the portion of the mapping data structure 210 whose evaluation is a logical precondition for generating the response 224 to a given request 122. Preconditions are logical conclusions based on dependencies 354 declared in the mapping data structure 210. Examples of dependencies 354 include, but are not necessarily limited to, recursive mappings, and invocations of functions.

During a mapping to M expression step 356, which is an example of mapping step 304, an embodiment maps a portion 202 of a path 204 to an expression 214 which is declared 358 in a version of the M programming language.

During a distributed request receiving step 360, an embodiment receives requests 122 at different machines (e.g., servers 103) from multiple sources 366 (e.g., clients 101). Step 360 may be viewed at a high level as an example of receiving step 302 that happens to include multiple clients and servers. Step 360 may also be viewed at a more detailed level as a step that includes multiple receiving steps 302.

During a concurrent evaluation step 362, an embodiment evaluates expression(s) 214 of a particular mapping data structure 210 at different machines, e.g., on several servers 103. Step 362 may be viewed at a high level as an example of evaluating step 308 that happens to include multiple servers. Step 362 may also be viewed at a more detailed level as a step that includes multiple evaluating steps 308.

During a response transmitting step 364, an embodiment transmits one or more response(s) 224 to request(s) 122. In some cases, a single response to a single request is transmitted to a single source 366. In other cases, at least in some embodiments, multiple responses to respective requests are transmitted to respective sources 366, namely, clients 101. Step 364 may be accomplished using familiar network transmission mechanisms, for example.

During a stream response generating step 312, an embodiment generates 312 a response 224 which contains a data stream 368 as at least part of the evaluation result 220.

During a URI mapping step 304, an embodiment maps a Uniform Resource Identifier 370 to an expression 214.

During a making step 372, an embodiment makes content 128 electronically accessible to an evaluator 216, such as a lazy evaluation mechanism 328. Step 372 may be accomplished using buffers, file systems, and/or other familiar mechanisms for making data available to an evaluator 216, for example.

During a dependency locating step 376, an embodiment automatically locates dependencies 354 that have been declared 378 in a mapping data structure 210. Step 376 may be accomplished by familiar parsing techniques adapted for use with mapping data structures 210, for example.

During an implementing step 380, an embodiment implements a web site 126. Step 380 may be accomplished with request receiving step 302, mapping step 304, evaluating step 308, and response generating step 312, for example. In some embodiments, implementing 380 only includes mapping step 304, evaluating step 308, and response generating step 312. The use of lazy evaluation by a given embodiment during evaluating step 308 facilitates implementing 380 an arbitrarily large web site 374, 126, because storage space need not be allocated up front for all of a sites structurally distinct web pages. Such a web site 374 may be arbitrarily large in the sense that it provides an arbitrarily large set of computable content, e.g., by supporting an arbitrarily large set of URLs, as opposed to having an arbitrarily large amount of stored content.

During a modeling step 382, an embodiment models a web site in at least one of two aspects. An embodiment may model the site by providing 384 a mapping data structure 210 to represent 386 the web site's hierarchical structure 388, e.g., like the directory hierarchy in which a developer organizes web site content 128. An embodiment may also model 382 the site by providing 390 a content stream or other content producer, e.g., by providing 390 an enumerator 392, character array 394, and/or byte array 396 to represent 398 web site content 128. Modeling step 382 may be accomplished by providing 384 a mapping 212 and evaluator 216, for example. Modeling step 382 may also be accomplished by providing 390 content while transmitting 364 a response 224, for example.

During a residing step 402, multiple copies of an expression evaluator 216 reside in a stateless middle tier 404 in a network, e.g., by configuring memory or other media 112 in middle tier machines. The middle tier is stateless in the sense that the expression evaluator 216 need not remember the result of a previous evaluation 308 to perform a current evaluation 308, except as needed within a recursive evaluation.

During a file-contents calling step 406, which is an example of executing step 320, an embodiment calls and hence executes a file-contents function 322, 408 to return contents 222 of a file 130, e.g., as a stream of characters or as binary data.

During a metadata including step 410, an embodiment includes in an evaluation 308 result 220 a metadata 412 value which specifies 414 a content type 416 for a file 130. For example metadata may be included 410 in a response for a file 130 named in the corresponding request 122. Content types 416 may be identified by familiar mechanisms such as file extensions, file headers, and file signatures.

During a side-effect function calling step 418, an embodiment calls (and thus executes 320) a function 322, 422 which causes a side-effect 420. For example, an embodiment may call a HTTP POST, PUT, and/or DELETE functions 422.

The foregoing steps and their interrelationships are discussed in greater detail below, in connection with various embodiments.

Some embodiments provide a process for implementing a web site, which is referred to herein for convenience as process embodiment one. The process includes receiving 302 an HTTP request which includes a path, and mapping 304 at least a portion of the path to locate an expression E in a nestable data structure which contains multiple expressions collectively representing the web site. Using a nestable data structure allows the expression E to generate additional structure for the web site, e.g., by recursion. The process also includes evaluating 308 the expression E, thereby obtaining a result R, while avoiding evaluating other expressions of the data structure. The process may repeat the mapping and evaluating steps for successive expression(s) E and corresponding successive result(s) R until an evaluating step yields website content as a result R-final. Some embodiments include generating 312 an HTTP response to the HTTP request. The HTTP response contains the evaluation result R (or R-final, in the event of recursion). Some embodiments generate an HTTP response containing a stream of web site content.

In some embodiments, the expression E is written in a declarative (as opposed to imperative) programming language 218. Accordingly, the evaluating step may include parsing 314 the expression E with a parser based on at least a syntax rule of the declarative programming language, and may include executing 320 a function which is invoked using a calling mechanism of the declarative programming language. Some embodiments utilize 326 a lazy evaluation mechanism of the declarative programming language.

As to mapping, in some embodiments the mapping step 304 maps 330 a file name to an expression containing a function call which returns contents of the file. One embodiment declares such a mapping as follows:
{Key="b.gif", Value=File:Contents("c:\b.gif")}

In some embodiments the mapping step 304 maps 336 a file name to an expression containing a function call which returns a text string. One embodiment declares such a mapping as follows:
{Key="c.txt", Value=Text:From(DateTime:Now( ))}

In some embodiments the mapping step 304 maps 340 a file name to an expression which evaluates to a text string. One embodiment declares such a mapping as follows:

---

{ Key = "a.html", Value = "<html><body>" + "hello" + "</body></html>" { Content:Type = "text/html" } }

In some embodiments the mapping step 304 recursively maps 342 a directory name to a mapping of a file name. One embodiment declares such a mapping generally as follows, where Map:From is a mapping 212 and <whatever> is either another recursively calculated value or (as eventually occurs) a terminal value terminating the recursion.

In some embodiments the mapping step 304 recursively maps 344 a dynamically constructable record (mapping data structure 210) which includes at least one field-value pair.

In some embodiments, the process evaluates 308, 350 at most a minimal portion of the mapping data structure, namely, the portion whose evaluation is a precondition for generating the HTTP response, as indicated by declared dependency(ies).

In some embodiments, the mapping step maps 304, 356 at least a portion of the path to an expression E in a mapping data structure which is declared in a version of an M programming language and/or a dynamically typed programming language. Dynamic typing may facilitate generating desired mapping data structures dynamically.

In some embodiments, a medium configured with code such as mapping code and evaluation code resides 402 on different machines in a network, and the process includes receiving 302 at the different machines multiple HTTP requests from multiple sources, and concurrently evaluating 308 expression(s) of the same mapping data structure on the different machines. The process concurrently generates 312 respective HTTP responses and transmits 364 the respective HTTP responses toward the multiple sources. In other embodiments, mapping 212 code and evaluation 216 code reside in processes or threads on the same machine.

In some embodiments, receiving, mapping, evaluating, and generating steps occur in a first instance for an HTTP request from a first user and also occur in a second instance for the same HTTP request from a second user. A result R1 of the first instance evaluating step differs from a result R2 of the second instance evaluating step. Different responses could be generated for different users, or based on other criteria, if the expression E can access components of the request and/or can access other services, for example.

Some embodiments provide a process for implementing a web site, which is referred to herein for convenience as embodiment nine. The process includes electronically declaring 358 a computer data structure which maps portions of a Uniform Resource Identifier (URI) path to respective expressions. For instance, the declared data structure may reside in and configure a computer-readable storage medium 112. The declaring step may electronically declare any of the mappings discussed herein, as mappings 212 and/or as mapping steps 304, 330, 336, 340, 342, 344, 356, for example, and may declare mapping data structures 210 in M and/or other declarative language(s) 218. The process makes 372 digital web site content electronically accessible to a fully automatic evaluation mechanism which is operable to perform lazy evaluation of the expressions based on automatically located dependencies that have been made declaratively. Embodiment nine may be viewed in relation to embodiment one, with regard to recursion, locating expressions, and allowing the expression value to be either another expression or a response to be returned to an HTTP request, for example. In this view, embodiment nine may be seen as supporting an implementation of embodiment one.

The process may implement 380 various web sites, including arbitrarily large web sites (web sites which have no fixed upper bound on storage size in the absence of lazy evaluation of the expressions). In particular, in some embodiments, the process models 382 a web site (and implements 380 it) by providing the mapping data structure to represent web site hierarchical structure, and by providing at least one of the following to represent web site content: an enumerator, an array of characters, an array of bytes.

Configured Media

Some embodiments include a configured computer-readable storage medium 112. Storage medium 112 may include disks (magnetic, optical, or otherwise), RAM, EEPROMS or other ROMs, and/or other configurable memory devices, as opposed to propagated signal media. The storage medium which is configured may be in particular a removable storage medium 114 such as a CD, DVD, or flash memory. A general-purpose memory, which may be removable or not, and may be volatile or not, can be configured into an embodiment using items such as mapping data structures 210 and/or other mappings 212, in the form of data 118 and instructions 116, read from a removable medium 114 and/or another source such as a network connection, to form a configured medium. The configured storage medium 112 is capable of causing a computer system to perform process steps for transforming data through lazy evaluation of mappings 212 as disclosed herein. FIGS. 1 through 4 thus help illustrate configured storage media embodiments and process embodiments, as well as system and process embodiments. In particular, any of the process steps illustrated in FIG. 3 and/or FIG. 4, or otherwise taught herein, may be used to help configure a storage medium to form a configured storage medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

First, the following remarks about syntax in the M programming language may be helpful to those not familiar with M.

The syntax var r={a=1+1} assigns a record value to the variable r. The record value contains a field named "a" that has the value 1+1. The value of field b is not computed until it is accessed. The syntax r.a will access the field of the record, thereby evaluating 1+1 and producing the value 2.

The syntax var m=map {"a"=1+1} assigns a map value to the variable m. The map value contains a key named "a" that has the value 1+1. The value of key "a" is not computed until it is accessed. The syntax m["a"] will access the field of the map, thereby evaluating 1+1 and producing the value 2.

The syntax var a=[1+1] assigns an array value to the variable a. The array value contains an element which has the value 1+1. The value of the element of the array is not computed until the array element is accessed. The syntax a[0] will access the first (zero'th) item of the array, thereby evaluating 1+1 and producing the value 2.

The syntax var e=enumerator [1+1] assigns an enumerator value representing a sequence of values to the variable e. The sequence contains a single element which has the value 1+1. The value of the element is not computed until it is accessed. The syntax e( ). Value will access the first value in the enumerator, thereby evaluating 1+1 and producing the value 2.

The syntax var f=(x, y)=>x+y assigns a function value to the variable f. The function value accepts two parameters, x and y, and adds them together. The function does not produce a value until it is called. The function is called using a syntax like f(1,1). When the function is called, the x+y expression is evaluated, with the value 1 substituted for x and y, producing the value 2.

The syntax ['a', 'b'] represents an array value containing two characters, which can also be written "ab", and is called a text value.

The syntax [$01, $02] represents an array containing two bytes (with hex values 01 and 02), which can also be written $[0102], and is called a binary value.

Any of the above type's values (arrays, records, functions, enumerators) can be combined with a metadata value to produce a new value. A metadata value is a record value that provides additional information about the value. The syntax x ^^ y where x and y are expressions creates a new value that has the value of x with metadata y. For example, "hello world" ^^ {Content:Type="text/plain"} creates a text value with a metadata record with a field named Content:Type with value "text/plain".

By way of context regarding the structure of web sites, it may be noted that in some Microsoft® ASP.NET web server environments, the contents 128 of a web site 126 can be modeled as files and directories in a file system. In this approach, the segments of a URL correspond to directories and the final segment corresponds to a file. When an HTTP request 122 is made, the contents of the file corresponding to the URL is returned in the response 224. The Content-Type header of the response has the content type that corresponds to the file extension of the file being accessed. For example, an HTTP GET request for the URL http://1 dot 2 dot 3 dot 4/a/b dot gif (periods replaced by dots to conform with Patent Office rules) would respond with the contents of the file b.gif in the directory a of the web site at the host machine with IP address 1.2.3.4. The Content-Type header of the response would be "image/gif" which corresponds to the file extension ".gif".

In addition to static content, a web site 126 may contain files with special file extensions that correspond to a mechanism that generates content dynamically for each request. For example, ASP.NET pages that have the extension .aspx can generate dynamic HTML content. This approach can also be used to generate a response for larger parts of a site, by inspecting the HTTP request and determining the appropriate response that corresponds to subsequent URL segments.

By way of context, and with regard to lazy evaluation of data structures generally, sometimes referred to as lazy data structures, the M programming language is an example of a programming language that permits an expression to generate a data structure whose parts are evaluated as the data structure is accessed. For example, the following declaration produces a map whose values are not evaluated until they are accessed:

```
map
{
  "b.gif" = File:Contents("c:\b.gif"),
  "a.html" = "<html><body>" + "hello" + "</body></html>",
  dir = map
  {
    "c.txt" = "hello world" ^^ { Content:Type = "text/plain" }
  }
}
```

For example, the value of key "b.gif" is the result of calling the function File:Contents with the path c:\b.gif which will return the contents of the file as binary data. The binary data will contain metadata that specifies the content type of the file, as determined by the file extension. The function call is not executed until the field "b.gif" is accessed in the map value. In a similar way, the expression that constructs the map value corresponding to the key "dir" is not evaluated until the key "dir" is accessed. In this way, the contents of the data structures are lazily evaluated.

Map values may be constructed dynamically in an M programming language environment. For example, a Map:From function could be used to generate such a map, even if the keys were not known at the time the program were written. In this case, the map values, such as the value of "b.gif", would still not be evaluated until accessed.

```
Map:From
(
  [
    { Key ="b.gif", Value = File:Contents("c:\b.gif") },
    { Key = "a.html", Value = "<html><body>" + "hello" +
    "</body></html>" },
    { Key = "dir", Value = Map:From([ { Key = "c.txt", Value =
    "hello world" ^^ { Content:Type = "text/plain" } ]) }
  ]
)
```

Instead of modeling a web site as directories and files in a file system, some embodiments combine lazy data structures with modeling of web sites as a hierarchy of content. For example, some embodiments model a web site as a set of lazy mapping data structures in the M programming language. Some embodiments use a mapping convention for generating HTTP responses given an HTTP request and a lazy mapping data structure. A map value is used to represent the structure of the site (rather than a directory), and an enumerator/array of characters/bytes is used to represent the content (rather than a file).

For example, a web site represented by the following expression running at a host with IP address 1.2.3.4:

```
map
{
  "b.gif" = File:AsBytes("c:\b.gif"),
  "a.html" =("<html><body>" + "hello" + "</body></html>") ^^
  {Content:Type ="text/html" },
  dir = map
  {
    "c.txt" = "hello world" ^^ {Content:Type = "text/plain" }
  }
}
``` would generate the following HTTP responses for HTTP requests with the following Uniform Resource Locators (URLs):

http://1 dot 2 dot 3 dot 4/b.gif // the binary content of the file b.gif with Content-Type "image/gif"
http:// 1 dot 2 dot 3 dot 4/a.html // the text content
<html><body>hello</body></html> with Content-Type "text/html"
http:// 1 dot 2 dot 3 dot 4/dir/c.txt // the text content hello world with Content-Type "text/html"

In such embodiments, the expression 214 is evaluated 308 for each request. Only the parts of the expression that are needed to answer the request are evaluated. In some embodiments, a single expression can be run concurrently, being evaluated 362 for many requests at the same time, providing for a scalable implementation of the web server. By using an enumerator of characters or bytes, the response can be streamed 368, which allows for a more scalable usage of memory on the web server because only a part of the response 224 needs to be in memory at a given time.

In some embodiments, an expression 214 can contain arbitrary code and can make arbitrary decisions about how the response 224 is formed. For example, different responses could be generated for different users 104, including transmitting 364 access results to some users and access denied responses (for example, using HTTP response status code of 403) to other users.

In some embodiments, a web site programmer can write an expression 214 that generates the contents of the site 126 using lazy data structures, and the system can automatically access the necessary parts of that data structure in order to generate responses 224. This approach is more declarative than other approaches, and can improve the productivity of the programmer. The structure of web sites is increasingly dynamic, and more focus is being placed on having a URL structure that reflects the logical organization of the site, rather than how the site is implemented. Using expressions 214 as described herein allows a programmer to go beyond familiar choices such as adding files to a file system for static web site structure and adding particular dynamic pages.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 4 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A computer-readable storage medium configured with data and with instructions that when executed by at least one processor causes the processor(s) to perform a process for implementing a web site, the process comprising the steps of:
   receiving an HTTP request which includes a path;
   mapping at least a portion of the path to locate an initial expression E in a nestable data structure which contains multiple expressions collectively representing the web site;
   evaluating the initial expression E thereby obtaining an initial result R, while avoiding evaluating other expressions of the nestable data structure; and then
   from the initial result R recursively mapping results to respective expressions by using mappings defined in the nestable data structure, and evaluating the respective expressions, until an evaluating step yields website content as a result R-final; and then
   generating an HTTP response to the HTTP request, the HTTP response containing the result R-final.

2. The configured medium of claim 1, wherein the expression E is written in a declarative (as opposed to imperative) programming language, and at least one of the evaluating steps includes at least one of the following:
   parsing the expression E with a parser based on at least a syntax rule of the declarative programming language;
   executing a function which is invoked using a calling mechanism of the declarative programming language;
   utilizing a lazy evaluation mechanism of the declarative programming language.

3. The configured medium of claim 1, wherein at least one of the mapping steps includes at least one of the following:
   mapping a file name to an expression containing a call to a function which returns contents of the file;
   mapping a file name to an expression containing a call to a function which returns a text string;
   mapping a file name to an expression which evaluates to a text string;
   recursively mapping a directory name to a mapping of a file name;
   recursively mapping a dynamically constructable record which includes at least one field-value pair.

4. The configured medium of claim 1, wherein the process evaluates at most a minimal portion of the data structure, namely, the portion whose evaluation is a precondition for generating the HTTP response, as indicated by declared dependency(ies).

5. The configured medium of claim 1, wherein at least one of the mapping steps maps at least a portion of the path to an expression E in a data structure which is declared in a dynamically typed programming language.

6. The configured medium of claim 1, wherein the configured medium resides on different machines in a network, and the process comprises:
- receiving at the different machines multiple HTTP requests from multiple sources;
- concurrently evaluating expression(s) of the same data structure on the different machines;
- concurrently generating respective HTTP responses; and
- transmitting the respective HTTP responses toward the multiple sources.

7. The configured medium of claim 1, wherein the generating step generates an HTTP response containing a stream of web site content.

8. The configured medium of claim 1, wherein receiving, mapping, evaluating, and generating steps occur in a first instance for an HTTP request from a first user and also occur in a second instance for the same HTTP request from a second user, and wherein a result R1 of the first instance evaluating step differs from a result R2 of the second instance evaluating step.

9. A process for implementing a web site, the process comprising:
- electronically declaring a computer data structure which maps portions of a Uniform Resource Indicator (URI) path to respective expressions using at least one recursive mapping defined in the computer data structure, the declared data structure residing in and configuring a computer-readable storage medium; and
- making digital web site content electronically accessible to a fully automatic evaluation mechanism which is operable to perform lazy evaluation of the expressions based on automatically located dependencies that have been made declaratively.

10. The process of claim 9, wherein the declaring step electronically declares at least one of the following:
- a mapping from a file name to an expression containing a call to a function which returns contents of the file;
- a mapping from a file name to an expression which evaluates to a text string;
- a recursive mapping of a dynamically constructable record.

11. The process of claim 9, wherein the declaring step electronically declares the data structure in a version of an M programming language.

12. The process of claim 9, wherein the process implements an arbitrarily large web site, namely, a web site which has no fixed upper bound on storage size in the absence of lazy evaluation of the expressions.

13. The process of claim 9, wherein the process models the web site by providing the data structure to represent web site hierarchical structure, and by providing at least one of the following to represent web site content: an enumerator, an array of characters, an array of bytes.

14. A computer system comprising:
- at least one logical processor;
- a memory in operable communication with the logical processor(s), the memory located in at least one machine;
- a recursive mapping residing in the memory comprising a nestable data structure which maps portions of a network application layer request to respective expressions which, upon evaluation, produce a response to the request wherein the mapping is a recursive mapping in that at least one mapping to an expression is defined recursively in the nestable data structure;
- a lazy expression evaluator residing in the memory and operable to evaluate an expression in response to a request to access a request portion which is mapped to the expression using the nestable data structure.

15. The system of claim 14, wherein the system further comprises at least one of the following: an HTTP request, an FTP request, another network application layer request utilizing a hierarchical naming scheme; and wherein the lazy expression evaluator is operable to evaluate an expression in response to the request.

16. The system of claim 14, wherein the system comprises copies of the lazy expression evaluator evaluating the same expression and residing on multiple machines in a stateless middle tier in a network.

17. The system of claim 14, wherein an expression in the mapping includes a call to a File-Contents function which is operable to return contents of a file as binary data.

18. The system of claim 14, wherein the system comprises and contains in memory:
- a network application layer request identifying a file;
- an expression to which the request is mapped; and
- a result of a lazy evaluation of the expression, the result including metadata which specifies a content type for the file.

19. The system of claim 14, wherein the mapping comprises a recursive mapping of a dynamically constructable record.

20. The system of claim 14, wherein an expression in the mapping includes a call to a function which is operable to produce a side-effect.

* * * * *